United States Patent

[11] 3,633,339

[72] Inventors Tadeusz K. Wiewiorowski;
John Ross Vincent, both of New Orleans, La.
[21] Appl. No. 776,387
[22] Filed Nov. 18, 1968
[45] Patented Jan. 11, 1972
[73] Assignee Freeport Minerals Company
New York, N.Y.

[54] RECOVERY OF SULFUR DIOXIDE FROM A SULFUR DIOXIDE-CONTAINING AQUEOUS AMMONIUM PHOSPHATE SOLUTION
9 Claims, 1 Drawing Fig.

[52] U.S. Cl. .................................................. 55/37,
23/312 R, 23/178, 23/180, 23/2 A, 55/73
[51] Int. Cl. ....................................................... C01b 17/56,
C01b 17/60, B01d 11/04
[50] Field of Search.......................................... 23/309,
312, 180, 178, 2; 55/68, 73, 37

[56] References Cited
UNITED STATES PATENTS
1,893,385  1/1933  Wettstein ..................... 23/180
1,946,489  2/1934  Jahn ............................. 23/180
2,264,878  12/1941  Hatch ........................... 55/73 X
2,448,719  9/1948  Latchum ...................... 55/73 X
3,139,324  6/1964  Housset ....................... 55/73 X
3,161,461  12/1964  Deal ............................. 55/73 X
3,357,821  12/1967  Henrickson ................. 23/312 X
3,495,933  2/1970  Renault ........................ 55/73 X
3,502,428  3/1970  Gelbein ........................ 55/73 X OTHER REFERENCES
Albright, Chem. Eng. Prog., #44, Vol. 59, 1963, pages 66 to 74.
Coleman, " Proceeding of Internat'l Conf.," Vol. 28, 1948, pp. 278 to 288.
Johnstone, Industrial Engin. Chem., Vol 34, #9, 1942, pp. 1017 to 1020, 1027, and 1028.
Keyes, Chemistry and Industry, 1934, pp. 692 to 695.
Smith, J.S.C.I., 67, Feb. 1948, pp. 48 to 51.
Wilson, Analytical Chemistry, Vol. 34, #2, Feb., ' 62 pp. 203 to 207.

Primary Examiner—Norman Yudkoff
Assistant Examiner—S. J. Emery
Attorney—Louis F. Reed ABSTRACT: A process for the removal of sulfur dioxide from gas streams by stripping with an aqueous ammonium phosphate solution. A process for the removal of the sulfur dioxide from the aqueous solution by liquid-liquid extraction with an immiscible organic amine solution. Next, recovering the sulfur dioxide from the organic solution by vacuum or steam distillation.

PATENTED JAN 11 1972
3,633,339
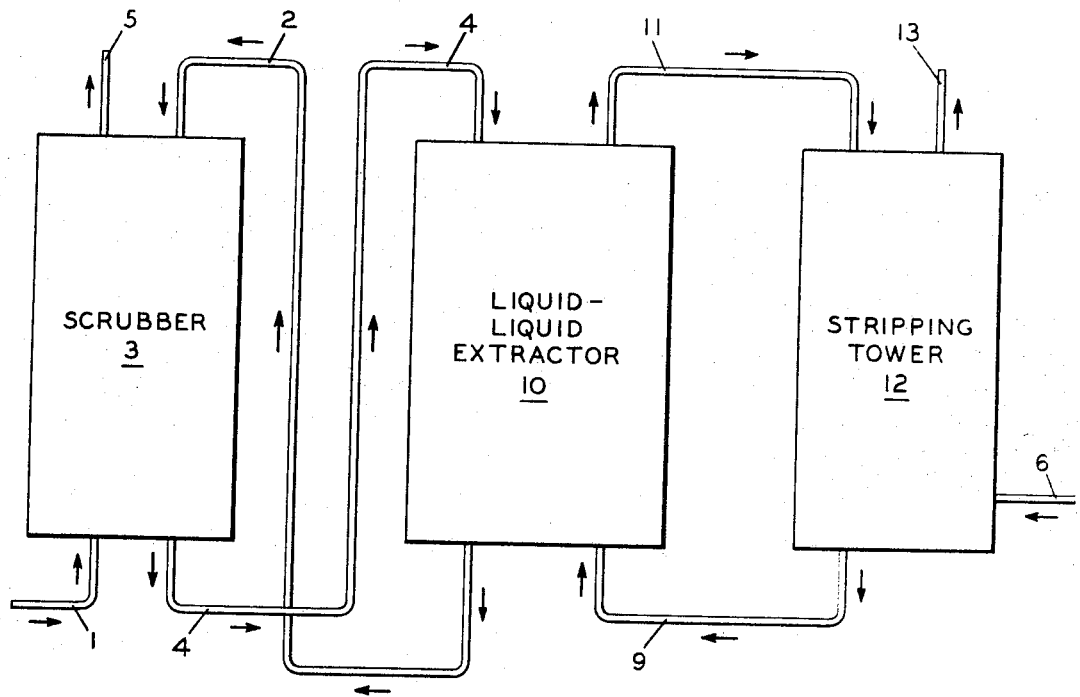

RECOVERY OF SULFUR DIOXIDE FROM A SULFUR DIOXIDE-CONTAINING AQUEOUS AMMONIUM PHOSPHATE SOLUTION

This invention relates to the removal of sulfur dioxide from an aqueous ammonium phosphate solution by means of liquid-liquid extraction using an immiscible organic amine solution.

As described in U.S. Pat. application Ser. No. 776,383, of Wiewiorowski and Slaten, filed concurrently sulfur dioxide can be removed effectively from gas streams by scrubbing the gas with aqueous ammonium phosphate solution. The details of the sulfur dioxide removal process as well as the advantages thereof over the prior art are discussed in the aforementioned application. For economical practice of the sulfur dioxide removal process, the sulfur dioxide should be recovered from the aqueous solution in a form utilizable as a raw material for other processes. One method for sulfur dioxide recovery, disclosed in the aforementioned application, is by steam distillation of the pregnant aqueous solution.

It is, accordingly, an object of the present invention to provide an improved process for the recovery of sulfur dioxide from a sulfur dioxide pregnant aqueous solution of ammonium phosphate.

It is a further object of the present invention to provide an efficient, economical process for recovering sulfur dioxide in a utilizable form from gas streams.

Other objects of the present invention will be apparent to those skilled in the art from the description which follows, taken in conjunction with the appended drawing, in which the figure is a block flow diagram of the process of the present invention.

In accordance with the present invention, it has been discovered that sulfur dioxide may be recovered from a sulfur dioxide pregnant aqueous ammonium phosphate solution by a liquid-liquid extraction process followed by distillation. The pregnant aqueous solution and a solution immiscible therewith of an amine in an organic solvent are fed to an extractor wherein the sulfur dioxide is transferred in a liquid-liquid extraction from the aqueous solution to the organic solution. The sulfur dioxide pregnant organic solution is fed to a stripper wherein a conventional distillation operation, such as vacuum or steam stripping, is utilized to recover sulfur dioxide in a utilizable form and to regenerate the organic solution.

The term, ammonium phosphate solution, as employed in the description and claims herein, is defined in the same manner as in the aforementioned application.

The solvent of the organic solution of the present invention is employed as a diluent for the amine and to prevent the formation of a solid or gelatinous amine, sulfur dioxide complex. A suitable solvent for the amine includes organic compounds, alone or in a mixture, which have certain characteristics. The compound should be immiscible with the aqueous ammonium phosphate. In addition, the compound should be in liquid form at atmospheric pressure in the temperature range of 30° to 125° C. and should readily dissolve the amine. Furthermore, the organic compound should have a vapor pressure at 125° C. of between zero and 750 mm. of mercury and, preferably, between zero and 50 mm. of mercury. The latter vapor pressure is preferred since use of a solvent with a vapor pressure of between 50 mm. and 750 mm. of mercury at 125° C., might result in undesirable loss of solvent as vapor in the distillation step which preferably is carried out at temperatures of 110° to 130° C. Hydrocarbons and higher molecular weight alkanols are preferred.

A representative group of organic solvents operable in the present invention are the following compounds or combinations thereof; kerosene, naphtha, straight-chain alkanes such as pentadecane, tridecane, tetradecane, and dodecane; branch-chained hydrocarbons such as 3,3-diethyl-2-methyl-pentane; and high molecular weight alcohols such as dodecanol, decanol, 2-methyl-2-octanol, and 2-methyl hexanol.

The organic solution should be immiscible with the aqueous phase for an effective liquid-liquid extraction.

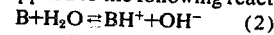

The concentration of the amine in the organic solution may vary over a wide range. A preferred concentration of amine is between 5 and 75 percent by weight of the organic solution.

The equilibrium constant, $K_B$, as used hereinafter, is defined by the following equation:

$$K_B = [BH^+][OH^-]/[B] \qquad (1)$$

Equation (1) is applied to the following reaction:

$$B + H_2O \rightleftharpoons BH^+ + OH^- \qquad (2)$$

The term, B, is an amine compound and the term, $OH^-$, is a hydroxide ion. The term, $BH^+$, is the ion formed in the combination of the amine with a hydrogen ion. To calculate $K_B$ of equation (1), the concentrations are expressed in terms of moles per liter. The equilibrium constant, $K_B$, is described in more detail in Conant et al., *The Chemistry of Organic Compounds* (3rd ed. 1947), and, in accordance with usual practice, is determined at a temperature of 25° C.

The amines suitable in the present process include primary, secondary, and tertiary amines with a $K_B$ value between $10^{-6}$ and $10^{-1}$, which are insoluble in the aqueous ammonium phosphate solution and which preferably have a vapor pressure between zero and 300 mm. and desirably between zero and 50 mm. of mercury at 125° C. Exemplary of such amines are the following compounds: decyl amine, dioctyl amine, tricaprylyl amine, trilauryl amine, di-2-octyl amine, triheptyl amine, dicyclohexyl amine, tetradecyl amine, and tetradecyldimethyl amine.

The organic extraction technique is utilizable for a sulfur dioxide pregnant aqueous ammonium phosphate solution with a pH of about 5.0 or less. As discussed in the aforementioned application, the recovery of the sulfur dioxide from a gas stream is accomplished most advantageously in an aqueous ammonium phosphate solution with a pH of about 3.0 to about 5.0, optimally about 3.5 to 4.5. Therefore, the organic extraction of the present invention commonly would be performed with an aqueous solution which had a pH of about 3.0 to about 5.0 prior to sulfur dioxide absorption. After sulfur dioxide absorption, the pH of the aqueous solution is usually in the range of about 1.0 to 4.9, and preferably between about 1.5 and 4.4.

In the removal of sulfur dioxide from a sulfur dioxide pregnant aqueous solution, the process of the present invention offers two major advantages over direct steam distillation of the pregnant aqueous solution. Firstly, sulfur dioxide removal according to the present process is substantially more efficient than removal by direct distillation, in that less steam is required per mass unit of sulfur dioxide recovered. Secondly, the present removal is easier to control than direct distillation of the pregnant aqueous solution due to the elimination of possible water condensation that might take place in the latter process.

The process of a preferred embodiment of the present invention will be described in conjunction with the flow diagram of the drawing.

As shown in the flow diagram, a sulfur dioxide containing gas stream 1 is fed to the bottom of a scrubbing unit 3 and a concentrated aqueous solution of ammonium phosphate and phosphoric acid 2 is fed to the top of the scrubbing unit 3; the scrubbing unit 3 is preferably a packed tower, but may be any suitable device for intimately contacting liquids and gases. The gas stream 1 is scrubbed therein with the solution 2 which results in the transfer of the sulfur dioxide from the gas stream 1 to the aqueous solution 2 forming a sulfur dioxide pregnant aqueous solution 4. The sulfur dioxide free gas stream 5 is then vented to the atmosphere.

Referring again to the flow diagram, a preferred method of removal of the sulfur dioxide from the pregnant aqueous solution 4 is by liquid-liquid extraction with an organic solution of an amine 9 immiscible with aqueous solution 4 followed by stripping of the sulfur dioxide from the organic solution 4. The pregnant aqueous solution 4 is fed from the scrubbing unit 3 to the top of a liquid-liquid extractor 10, and the immiscible organic amine solution 9 is fed to the bottom thereof. Sulfur dioxide is stripped from the aqueous solution 4 by the amine solution 9 and forms therewith a sulfur dioxide pregnant amine solution 11. The regenerated aqueous solution 2 is recycled to the top of the scrubbing unit 3.

As further shown in the flow diagram, the pregnant organic solution 11 is fed from the extractor 10 to the top of a stripping tower 12 and contacted directly with live steam 6. Sulfur dioxide is stripped from the organic solution 11 by the steam 6 and forms therewith the recovered sulfur dioxide stream 13 which may be either recovered as a liquid or fed directly to a plant which manufactures sulfuric acid. The regenerated organic solution 9 is recycled from the bottom of the tower 12 to the bottom of the extractor 10. A preferred temperature of the steam 6 fed to the stripping tower 12 is from about 110° to about 130° C.

Although in a specified embodiment, the step of stripping the sulfur dioxide from the pregnant organic solution is accomplished by steam distillation, it is understood that other operations such as vacuum distillation may be employed.

In order more clearly to disclose the nature of the present invention a specific example of the practice of the invention is herein given. It should be understood, however, that this is done by way of example and is intended neither to delineate the scope of the invention nor limit the ambit of the appended claims.

EXAMPLE

An aqueous solution of dibasic ammonium phosphate and ortho-phosphoric acid, containing about 40 grams of ammonia per liter and about 115 grams of phosphoric pentoxide per liter and having a pH of 4.3, is introduced to the top of a packed scrubbing column at the rate of 0.04 liter per minute. A mixture of gaseous nitrogen and sulfur dioxide containing about 0.5 percent sulfur dioxide is fed to the bottom of the scrubbing column at the rate of 80 cubic feet per hour. This is equivalent to a mass flow rate ratio of 1.0, the mass flow rate of both gas and liquid being 5.80 pounds per hour. Analysis of both inlet and outlet gas streams by gas chromatography shows that essentially all of the sulfur dioxide is removed from the gas stream in the column.

The pregnant aqueous scrubbing solution is then transferred to the top of an identical column and an organic solution consisting of 10 percent decanol, 80 percent kerosene, and 10 percent tricaprylylamine is fed to the bottom thereof. The organic phase is fed at about three times the volumetric flow rate of the aqueous phase and the rate of efflux of both liquids is controlled to match the feed rate. The action of the pumps feeding the two liquids is used to impart a degree of oscillatory motion to the fluid in the column, thus increasing the efficiency of the extraction. Under these conditions it was found that about 75 percent of the $SO_2$ in the aqueous phase is transferred to the organic phase.

The aqueous solution is then returned to the scrubbing column and the organic phase is fed to a stripping tower wherein it is contacted with steam at 120° C. The stripped organic solution is returned to the liquid-liquid extraction unit and the sulfur dioxide is dried and then compressed and recovered as a liquid.

As will be recognized by those skilled in the art, in the foregoing example, the tricaprylyl amine may be replaced by an equivalent amount of decyl amine, dioctyl amine, trilauryl amine, di-2-octyl amine, triheptyl amine, dicyclohexyl amine, tetradecyl amine, tetradecyldimethyl amine, etc. Similarly, the decanol and kerosene may be replaced with naphtha, pentadecane, 3,3-diethyl-2-methylpentane, dodecanol, tridecane, dodecane, 2-methylhexanol, etc.

The process is easily adapted to being carried out continuously, although it may be performed batchwise.

The terms and expressions which have been employed are used as terms of description not of limitation, and there is no intention in the use of such terms and expressions of excluding any equivalents of the features shown and described or portions thereof, but it is recognized that various modifications are possible within the scope of the invention claimed.

What is claimed is:

1. A process for removing sulfur dioxide from a gas stream which comprises treating the gas stream with an aqueous ammonium phosphate solution having a pH value of not greater than about 5.0 to extract the sulfur dioxide, contacting the sulfur dioxide containing aqueous solution with an organic solution comprising an organic solvent and an amine, which organic solution and which amine are immiscible with said aqueous solution, said amine having an equilibrium constant, $K_B$, of between $10^{-1}$ and $10^{-6}$, to selectively extract the sulfur dioxide, separating said organic solution containing extracted sulfur dioxide from said aqueous solution, and recovering the sulfur dioxide from the sulfur dioxide containing organic solution.

2. The process according to claim 1 wherein the amine is insoluble in said aqueous ammonium phosphate solution and the amine has a vapor pressure between about 0 and 300 mm. of mercury at 125° C.

3. The process according to claim 1 wherein the organic solvent is selected from the group consisting of hydrocarbons and higher molecular weight alkanols.

4. The process according to claim 1 wherein the amine concentration is between about 5 and about 75 percent of the organic solution.

5. The process according to claim 1 wherein the vapor pressure of the organic solvent at 125° C. is not greater than 750 mm. of mercury.

6. The process according to claim 1 wherein the vapor pressure of the organic solvent at 125° C. is between about zero and about 50 mm. of mercury.

7. The process according to claim 1 wherein the sulfur dioxide is recovered by steam stripping the sulfur dioxide containing aqueous solution to produce a sulfur dioxide distillation and a stripped organic solution bottoms.

8. The process according to claim 1 wherein the sulfur dioxide is recovered by vacuum distillation of the sulfur dioxide containing aqueous solution to produce a sulfur dioxide distillate and a stripped organic solution bottoms.

9. The process according to claim 1 wherein the aqueous ammonium phosphate solution has a pH value between about 3.0 and about 5.0.

* * * * *

UNITED STATES PATENT OFFICE
CERTIFICATE OF CORRECTION

Patent No. 3,633,339                    Dated January 11, 1972

Inventor(s) Tadeusz K. Wiewiorowski and John Ross Vincent

It is certified that error appears in the above-identified patent and that said Letters Patent are hereby corrected as shown below:

Column 1, line 8, "Ser. No. 776,383" should be "Ser. No. 776,386".

Column 3, line 15, "specified" should be "specific".

Column 4, line 49, "distillation" should be "distillate".

Column 4, line 50, "solutioh" should be "solution".

Signed and sealed this 13th day of June 1972.

(SEAL)
Attest:

EDWARD M. FLETCHER, JR.                 ROBERT GOTTSCHALK
Attesting Officer                       Commissioner of Patents